March 11, 1952 — A. H. BARNES — 2,588,466

ELECTRICAL GENERATOR

Filed Oct. 24, 1950 — 2 SHEETS—SHEET 1

INVENTOR.
Arthur H. Barnes
BY Roland A. Anderson
Attorney

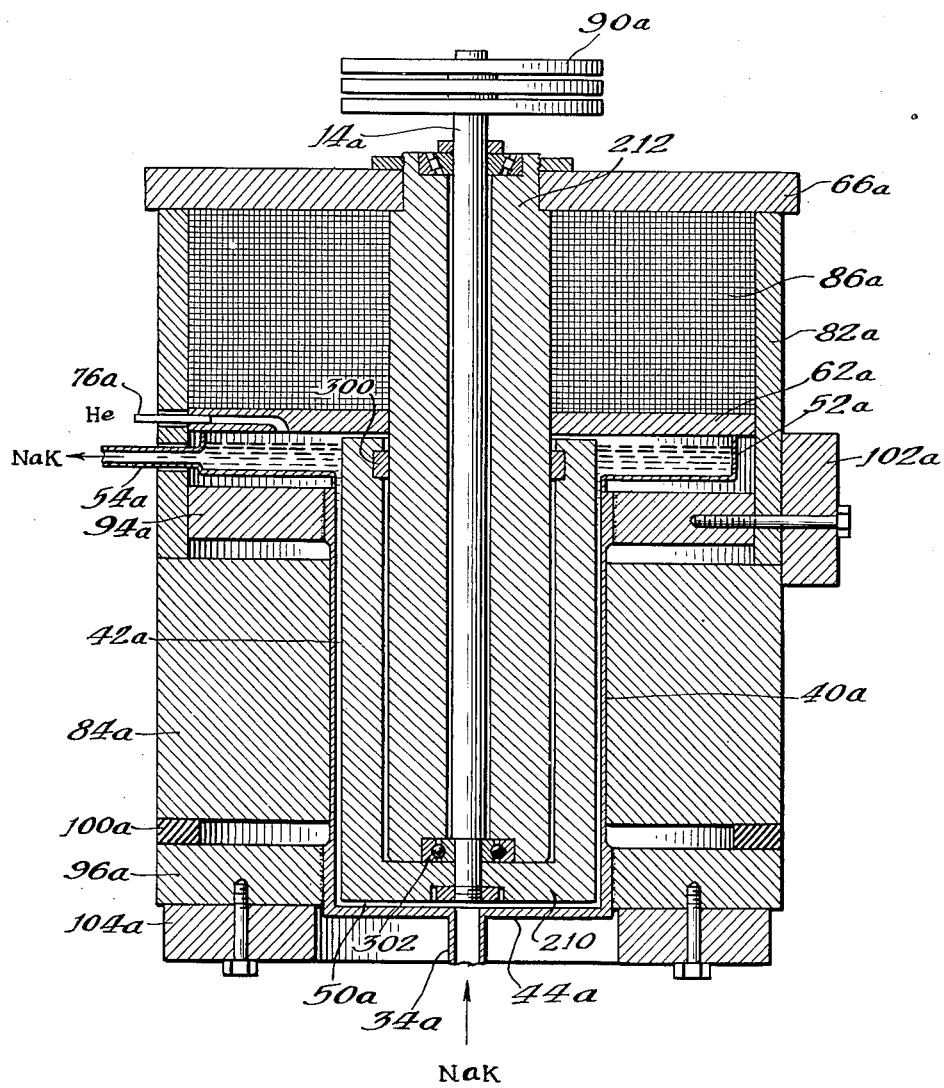

Patented Mar. 11, 1952

2,588,466

UNITED STATES PATENT OFFICE 2,588,466

ELECTRICAL GENERATOR

Arthur H. Barnes, Downers Grove, Ill., assignor to the United States of America as represented by the United States Atomic Energy Commission Application October 24, 1950, Serial No. 191,846

6 Claims. (Cl. 171—212)

This invention relates to an improvement in direct current generators. More particularly, the invention relates to the type of direct current generator known as a unipolar or homopolar generator.

Unipolar or homopolar generators have been known since the earliest period in the development of machines for generating electricity. A homopolar generator of the type to which the present invention relates consists, fundamentally, of a disk or a cylinder of a conductive material such as copper, which is rotated in a magnetic field. If the magnetic field is parallel with the axis of rotation of the unitary conducting armature, an E. M. F. is generated radially, i. e., there is generated a radial potential difference. In such cases, a disk is commonly employed as the rotor or armature, and the terminals of the generators are bus bars which are connected respectively to the shaft of the armature and to the periphery of the armature by suitable brushes. If, on the other hand, a radial magnetic field is employed, the E. M. F. will be generated between the longitudinal ends of the armature, and the output bus bars are accordingly connected to the ends of the armature, which is normally an elongated cylinder in this case, by suitable brushes. The E. M. F. developed in either case depends on the amount of magnetic flux which is cut and on the rotational speed of the conductor constituting the armature. Since the machine has, in general, only a single armature conductor, it produces pure continuous D. C. power without the necessity of the provision of a commutator. The elimination of the commutator, and of the discontinuities in output caused thereby, is made possible by the elimination of the reversal of polarity of the generated E. M. F. which occurs in the conductors of a conventional generator in each cycle of rotation, due to the fact that in the conventional generator, the armature is rotated in a flux field in which the flux lines are substantially parallel and normal to the axis of rotation.

Despite these known advantages of homopolar generators, these devices have nevertheless not come into common use. Such generators are reasonably efficient only for producing large amounts of current at low voltage. It is therefore required that the resistance at the brushes or sliding contacts which connect the armature to the external bus bars be extremely small. Thus, in order to produce reasonable efficiencies, the brushes must be in contact with the armature around substantially its entire periphery. Since this periphery must be fairly large in order to make the machine capable of producing large currents, the few homopolar generators which have been commercially constructed use an elaborate array of several hundred carbon brushes bearing against a massive rotating armature.

Attempts have been made to employ liquid brushes with homopolar generators. The advantages of liquid brushes to establish contact with rotating armatures are well-known, and liquid brushes have been employed in many types of rotating electrical generators and motors. However, prior to the present invention, attempts to employ liquid brushes with homopolar generators have produced devices of such low efficiency as to render them impractical. Furthermore, the prior attempts to employ liquid brushes with homopolar generators, particularly those of the type employing a radial magnetic field and an elongated armature, have introduced so many complexities such as, for example, the necessity of rotating liquid seals to contain the conducting liquid brushes, that even such an inconvenient device as the provision of hundreds of solid brushes was deemed preferable.

In general, the present invention teaches that homopolar generators of much higher efficiency than those employing liquid brushes of mercury or similar conducting liquids heretofore employed may be constructed by employing as the material of the liquid brushes an alkali metal, or an alloy consisting of such metals, and preferably an alloy containing from 5% to 55% sodium and from 45% to 95% potassium, which alloys are liquid at room temperatures. It is found in accordance with the invention that the employment of such metals or alloys as liquid brushes in a homopolar generator produces a generator efficiency, when feeding a high-current low-voltage load, that far exceeds any efficiencies obtainable with liquid brushes heretofore employed, and yet eliminates the complexity entailed in large numbers of solid brushes. Subsidiary to this general teaching of incorporation of such metals and alloys in the liquid brush structure of a homopolar generator, the invention provides a homopolar structure which is peculiarly adapted for the employment of such liquid metals and alloys as the brush material thereof. The present invention further provides various features of construction of a homopolar generator which contribute in other respects to maximizing its efficiency and minimizing its cost of construction and maintenance.

For understanding of the invention, reference is made to the attached drawings, in which.

Figure 1:
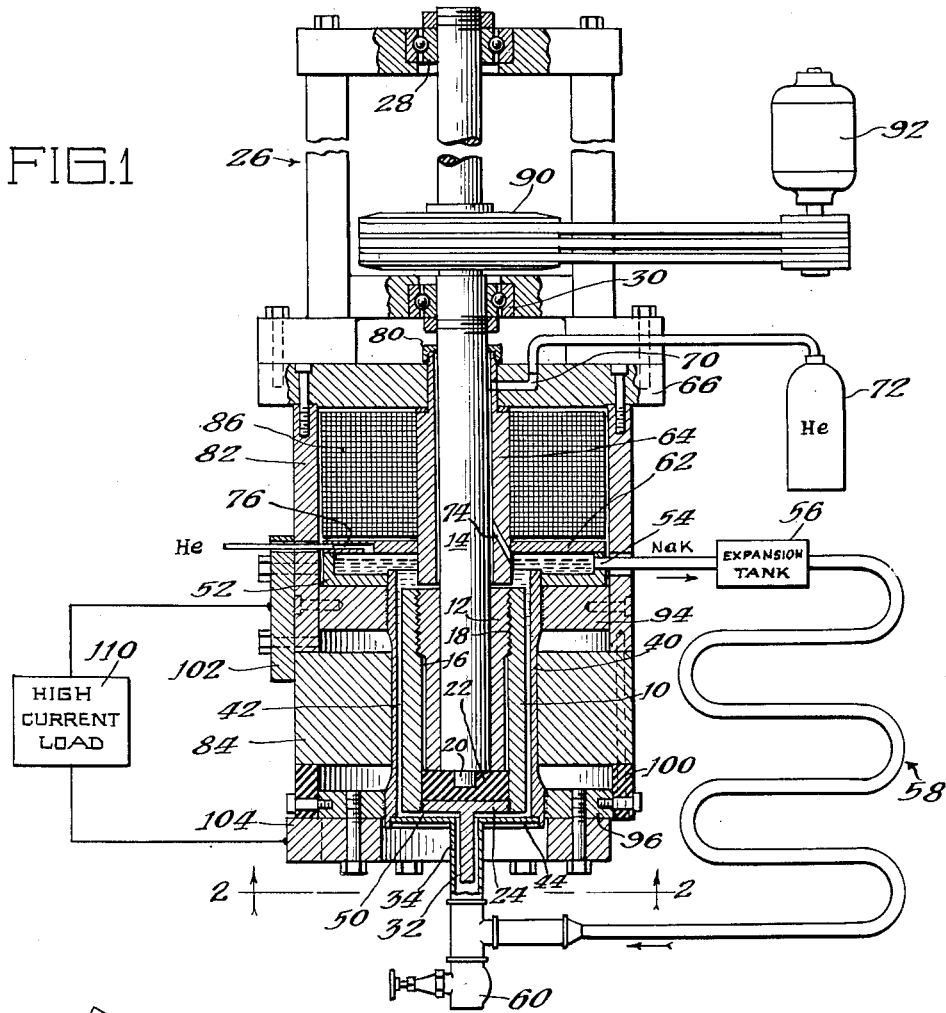
Figure 1 is a vertical sectional view of a homopolar generator constructed in accordance with the invention, together with certain schematically illustrated devices which are employed therewith.
Figure 2:
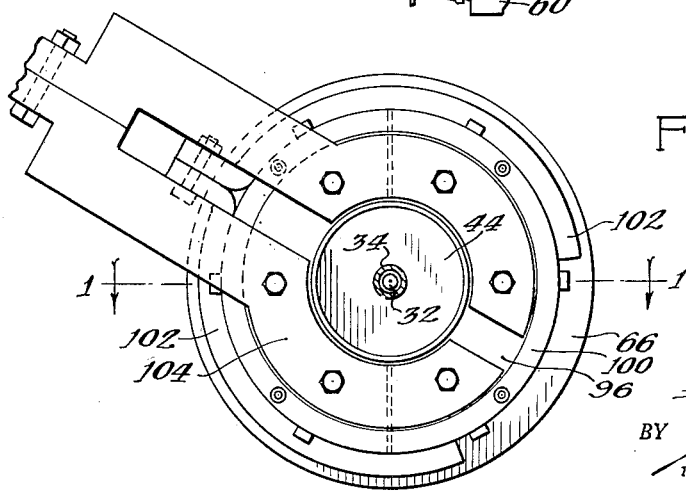
Figure 2 is a horizontal sectional view taken along the line 2—2 of Figure 1 in the direction indicated by arrows; and, Figure 3 is a vertical sectional view of a modified homopolar generator made in accordance with the invention.

Referring first to the embodiment of Figures 1 and 2, a thick-walled copper cylinder or sleeve 10 is threaded over a magnetic iron core 12 which is affixed to a central steel shaft 14. A small air gap 16 is provided along most of the length of the core 12 between the outer surface of the core 12 and the inner surface of the cylinder 10, these members being in contact only at the upper threaded portion 18. At the lower end of the cylinder 10, the shaft 14 is held centered to maintain the air gap 16 by a gudgeon 20 on the lower end of the shaft 14, seated in an insulating disk 22. The insulating disk 22 is held in place by an end plug 24 of steel which is threaded into the cylinder 10. This assembly is supported by the shaft 14, which is supported on a superstructure generally designated by the numeral 26, at the top of the device, by means of bearings 28 and 30. The plug 24 has a depending center portion 32 which rotates loosely in a fixed tube 34 (a conduit for purposes hereinafter to be described) to hold the shaft in alignment.

The armature cylinder 10 is supported in the manner thus described within a coaxial thin cylindrical sleeve 40 of stainless steel, there being a small annular gap 42 between the outer surface of the armature sleeve 10 and the inner surface of the sleeve 40. A flange 44 on the tube 34 is sealed on its periphery to the lower end of the sleeve 40, thus forming an open-top chamber which is fully occupied by the armature assembly except for the annular gap 42 and a similar gap 50 at the bottom of the chamber, which permits flow of fluid from the tube 34 upward through the annular gap 42. The upper end of the sleeve 40 is surrounded by a cup-shaped flange 52, to which is connected a liquid outlet 54. The outlet 54 is connected to the inlet tube 34 through a cooling and circulation system including an expansion tank 56 and a heat exchanger 58. The entire flow system thus described is filled with an alloy consisting of approximately 77% potassium, and the balance sodium, a eutectic alloy having a melting point below 0° C. A suitable valve 60 is provided for filling and emptying the system. The upper end of the cup-shaped flange 52 is sealed by a lid 62. Extending through the lid 62, and sealed thereto, is a magnetic iron sleeve 64, which depends centrally from a magnetic iron plate or disk 66 upon which the superstructure 26 is mounted. The lower end of the magnetic sleeve 64 is so close to the upper end of the magnetic iron sleeve 12 as to be virtually in sliding contact therewith. The fixed magnetic iron sleeve 64, within which the central portion of the shaft 14 rotates, and the rotating magnetic iron sleeve 12, which is affixed to the shaft, thus constitute a single iron core having a fixed portion and a rotating portion.

A port 70 communicates between the upper surface of the plate 66 and the interior of the fixed core sleeve 64 within which the shaft 14 rotates. A source 72 of inert gas such as helium is connected to the port 70. A port 74 through the wall of the fixed sleeve 64 connects the annular clearance space between the shaft 14 and the sleeve 64 to the cavity formed by the cup-shaped flange 52. Thus the sodium-potassium alloy is blanketed with inert gas. A port 76 in the lid 62 of the cup-shaped flange 52 permits egress of the inert gas, which thus may be continuously circulated at superatmospheric pressure above the surface of the NaK alloy. In this manner, the possibility of an explosion resulting from the highly pyrophoric properties of the NaK alloy is avoided. A shaft seal 80 is provided to prevent undesired leakage of helium from the system, but it will be noted that this seal need not be completely leak-proof, since no hazard arises from leakage into the atmosphere of small amounts of helium.

Bolted to the under surface of the magnetic iron plate or disk 66 is a cylindrical shell 82 which is likewise of magnetic iron. To the lower end of the shell 82 is secured an annular magnetic iron yoke 84, the inner surface of which is in abutment against the outer surface of the thin stainless steel sleeve 40. Surrounding the fixed core sleeve 64 in the upper portion of the shell 82 is a doughnut electromagnet 86. It will be seen that the assembly of core sleeves 64 and 12, top plate 66, fixed shell 82 and yoke 84 constitutes an efficient core and flux-return assembly for concentrating a radial magnetic field through the wall of the cylindrical copper sleeve 10.

At the upper end of the shaft 14 is a belt pulley 90 which is driven by a motor 92 to rotate the sleeve 10 in the radial magnetic field so maintained. Such rotation generates an E. M. F. between the upper end and the lower end of the sleeve 10. Copper bus rings 94 and 96 are silver soldered to the upper and lower portions, respectively, of the outer surface of the stainless steel sleeve 40, the ring 94 being bolted to the shell 82, and the ring 96 being bolted to an insulating non-magnetic sleeve 100, the upper edge of which contacts the lower surface of the yoke 84. Bus bar straps 102 are bolted to the outer surface of the shell 82 to contact the bus ring 94 through the relatively low resistance of the shell 82. Bus half-rings 104 are bolted to the ring 96. The straps 102, which are secured together, and the half-rings 104, which are likewise secured together, constitute the output terminals of the generator. These terminals are connected to a suitable high current load 110. One type of load 110 for use with which the generator illustrated in Figures 1 and 2 has been found particularly useful is a direct current electromagnetic pump, requiring currents of from 10,000 to 20,000 amperes for pumping liquid metals.

It will be seen that the present structure employed for connecting the rotating armature sleeve 10, in which the E. M. F. is generated, to the output terminal buses 102 and 104 is extremely simple, consisting of the liquid sodium-potassium alloy at the bottom and top, respectively, of the annular gap 42 between the armature sleeve 10 and the surrounding stainless steel sleeve 40. The thin sleeve 40 makes a low-resistance connection between the bus rings 96 and the respective portions of the conducting liquid. The use of the sodium-potassium alloy as the material of these liquid brushes contributes greatly to the efficiency of the pump, because of the fact that the excellent wetting properties of such alloys create between the ends of the wall of the armature 10 and the respective output terminals a conductive path of far lower resistance than is obtainable with such liquids as mercury. The unalloyed metals or other alkali metals, such as lithium or cesium, may also be employed with similar advantage, but do not offer the advantage of being liquid at room temperatures, a property possessed by the alloys described. However, the alkali metals, and alloys thereof, are all low melting, so that they become liquid due to friction after a short period of operation, or simple preheating means may be provided if desired.

It will be noted that two current leakage paths exist in the structure illustrated. One is along the wall of the stainless steel sleeve 40. The other is through the NaK alloy which fills the gap 42 between the sleeve 40 and the rotor sleeve 10 in the central longitudinal portion thereof, between the upper and lower portions in each of which the conducting liquid is actually employed as a liquid brush. This structure is employed in order to obviate the difficulties which would be introduced if it were attempted to insulate the liquid brush material at the top of the gap 42 from the liquid brush material at the bottom of the gap 42. Such an insulated structure would require the provision of rotating liquid seals, in addition to the provision of separate fluid circulation systems. It is found that by making the wall of the sleeve 40 thin, and by using therefor a material of relatively high resistivity such as stainless steel, preferably of the type commonly designated "347," it is possible to limit the leakage current through the sleeve 40 to relatively small percentages of the output current, provided that a load 110 of sufficiently low resistance is employed with the generator. The leakage through the liquid itself can be made even smaller. The thickness of the liquid layer is made very small; additionally, since at least the inner portion of the liquid is rotated by the force exerted upon it by the rotor 10, an E. M. F. is developed in the liquid itself, thus even further limiting the leakage current. The rotation of the liquid in the annular gap 42 is aided by the interaction between the magnetic field and the small leakage current which exists.

As stated immediately above, efficient operation of the generator requires that annular gap 42 in which the liquid alloy is disposed be very thin. When mercury or similar conducting liquids are employed as the brush material, the thin layer of liquid creates such a resistance to rotation of the rotor 10 by the motor 92 due to the viscosity of the liquid that the efficiency is far lower than it is with liquid alkali metals. It is found that the use of NaK alloys containing from 5% to 55% sodium and from 45% to 95% potassium as the brushes in this type of generator serves to make the generator a practical and efficient source of current, both because of the wetting properties of these alloys, which produce very low resistance contacts, and because of the low viscosity of such alloys.

In one embodiment of the device illustrated in Figures 1 and 2, the field coil 86 was 12 inches in diameter and 6 inches high and was wound with No. 16 glass insulated copper wire. The coil had a resistance of 27 ohms. A current of three amperes through the coil was sufficient to cause the magnetic circuit consisting of core portions 12 and 64, plate 66, and yoke 84 to saturate. The rotor sleeve 10, of copper, was 6 inches in diameter with a one-inch wall thickness. The central portion of the sleeve 40 was 0.032 inch in thickness, and the thickness of the gap 42 was 0.062 inch. With the sleeve 10 rotated at 3600 R. P. M., and a saturated magnetic field, the generator produced (with various resistances of the load 110) currents of from 10,000 to 45,000 amperes at voltages from 0.51 to 0.29 volts. Efficiencies of over 60% were produced with currents of over 20,000 amperes. The overall dimensions of the generator (excluding the superstructure 26 and the external circulation system) were 22 inches high by approximately 20 inches in diameter.

In Figure 3 is shown a modification of the generator illustrated in Figures 1 and 2. The elements designated by the reference numerals 14a, 34a, 40a, 42a, 44a, 50a, 52a, 54a, 62a, 66a, 76a, 82a, 84a, 86a, 90a, 94a, 96a, 100a, 102a, and 104a correspond respectively to the elements designated by the numerals 14, 34, 40, 42, 44, 50, 52, 54, 62, 66, 76, 82, 84, 86, 90, 94, 96, 100, 102, and 104 in Figures 1 and 2, the reference characters being the same except for the addition of the letter "a." In this case the armature 210 is cup-shaped, the lower end of the shaft 14 being secured to the center of the bottom of the cup-shaped rotor 210. The core 212 is a unitary stationary structure extending the entire length of the cup-shaped rotor 210, the shaft 14a rotating on the axis of the core 212 and the wall of the rotor 210 rotating around the stationary core 212. A rotating liquid seal 300 is provided between the inner surface of the cup-shaped rotor 210, at the top thereof, and the outer surface of the core 212, in order to prevent entrance of the conducting liquid into the clearance gap between these members, since the filling of this gap with the conducting liquid would create an additional leakage path for the generated current through the core 212. A bearing 302 is provided between the rotating shaft 14 and the stationary core 212. In other respects, the modification of Figure 3 is similar to the device shown in Figures 1 and 2.

It will be understood that the teachings of the invention are not limited to the specific embodiments herein illustrated and described. Accordingly the scope of the invention shall be deemed to be limited only by the appended claims.

What is claimed is:

1. A high-current generator comprising, in combination, a conducting cylinder, a sleeve coaxially surrounding the cylinder and of an inner diameter slightly greater than the outer diameter of the cylinder, whereby there is formed an annular gap between said cylinder and said sleeve, means for maintaining a radial magnetic field across the annular gap, a sodium-potassium alloy containing from 5% to 55% sodium and from 45% to 95% potassium filling at least two longitudinally spaced portions of the annular gap, means for rotating only one of said coaxial elements around the common axis, and bus bars in low resistance connection with the conducting liquid at the longitudinal positions corresponding to said longitudinally spaced portions of the annular space.

2. A high-current generator comprising, in combination, a conducting cylinder, a thin sleeve coaxial with the cylinder and forming a thin annular gap between said cylinder and said sleeve, means for maintaining a radial magnetic field across the annular gap, an electrically conducting liquid filling the annular gap, means for rotating the conducting cylinder around the common axis, bus bars in low-resistance connection with the conducting liquid in the gap at longitudinally spaced positions, fluid passage means connected to the opposite ends of said annular gap, and external flow path means connecting said passage means and including a heat exchanger.

3. A high-current generator comprising, in combination, a cylindrical sleeve, a conducting rotor disposed on the interior of the sleeve and forming an annular gap between the inner surface of the sleeve and the outer surface of the rotor, a liquid inlet and outlet to said gap, a filling of alkali metallic liquid within said gap, means for maintaining a radial magnetic field across said gap, means for rotating the rotor, bus bars in contact with the outer surface of the sleeve at the respective ends thereof, means connected to said inlet and outlet to circulate and cool the liquid, and means for maintaining the upper surface of the liquid blanketed in an inert gas.

4. A high-current generator comprising, in combination, a cylindrical sleeve, a conducting rotor disposed on the interior of the sleeve and forming an annular gap between the inner surface of the sleeve and the outer surface of the rotor, a liquid inlet and outlet to said gap, a filling of sodium potassium alloy containing from 5% to 55% sodium and from 45% to 95% potassium within said gap, means for maintaining a radial magnetic field across said gap, means for rotating the rotor, bus bars in contact with the outer surface of the sleeve at the respective ends thereof, means connected to said inlet and outlet to circulate and cool the sodium potassium alloy, and means for maintaining the upper surface of the alloy blanketed in an inert gas.

5. In a high-current generator comprising, in combination, a unitary conducting armature, means for maintaining a magnetic field through said armature, means for rotating the armature in the field, and conducting brush means in contact with the armature at points differing in potential due to such rotation, the improvement wherein said brush means comprises at least one body of liquid consisting of at least one alkali metal.

6. The apparatus of claim 5 wherein the body of liquid consists of an alloy of sodium and potassium containing from 45% to 95% potassium and from 5% to 55% sodium by weight.

ARTHUR H. BARNES.

REFERENCES CITED

The following references are of record in the file of this patent:

UNITED STATES PATENTS

| Number | Name | Date |
| --- | --- | --- |
| 338,169 | Forbes | Mar. 16, 1886 |
| 561,803 | Mayer | June 9, 1896 |
| 1,726,426 | Distelli | Aug. 27, 1929 |
| 2,250,212 | Suits | July 22, 1941 |
| 2,387,313 | Wilson | Oct. 23, 1945 |